US010924182B2

(12) United States Patent
Watté et al.

(10) Patent No.: US 10,924,182 B2
(45) Date of Patent: Feb. 16, 2021

(54) INTEGRATED OPTICAL SWITCHING AND SPLITTING FOR TROUBLESHOOTING IN OPTICAL NETWORKS

(71) Applicant: COMMSCOPE CONNECTIVITY BELGIUM BVBA, Kessel-Lo (BE)

(72) Inventors: Jan Watté, Grimbergen (BE); Cristina Lerma Arce, Gentbrugge (BE); Stefano Beri, Zaventem (BE); Jan Jozef Julia Maria Erreygers, Tielt-Winge (BE); Koen Huybrechts, Heverlee (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 5 days.

(21) Appl. No.: 15/770,446

(22) PCT Filed: Oct. 21, 2016

(86) PCT No.: PCT/EP2016/075475
§ 371 (c)(1),
(2) Date: Apr. 23, 2018

(87) PCT Pub. No.: WO2017/068170
PCT Pub. Date: Apr. 27, 2017

(65) Prior Publication Data
US 2018/0316419 A1 Nov. 1, 2018

Related U.S. Application Data

(60) Provisional application No. 62/245,650, filed on Oct. 23, 2015.

(51) Int. Cl.
*H04B 10/071* (2013.01)
*H04J 14/02* (2006.01)
*H04Q 11/00* (2006.01)

(52) U.S. Cl.
CPC ........ *H04B 10/071* (2013.01); *H04J 14/0227* (2013.01); *H04Q 11/0005* (2013.01); *H04Q 2011/0035* (2013.01)

(58) Field of Classification Search
CPC ............... H04B 10/071; H04J 14/0227; H04Q 11/0005; H04Q 2011/0035
See application file for complete search history.

(56) References Cited

U.S. PATENT DOCUMENTS 5,943,123 A * 8/1999 Oshimi .............. G01M 11/3145
356/73.1
6,396,573 B1 * 5/2002 Pimpinella ........... H04B 10/071
356/73.1

(Continued)

FOREIGN PATENT DOCUMENTS

EP  1 130 806 A2  9/2001
EP  2 490 350 A1  8/2012

(Continued)

OTHER PUBLICATIONS

International Search Report and Written Opinion of the International Searching Authority for corresponding International Patent Application No. PCT/EP2016/075475 dated Jan. 30, 2017, 13 pages.

(Continued)

*Primary Examiner* — Mina M Shalaby
(74) *Attorney, Agent, or Firm* — Merchant & Gould P.C.

(57) ABSTRACT

The invention is directed to a system and method for troubleshooting in an optical data network that has a laser transmitter/receiver unit that outputs a data signal and an OTDR unit that produces an OTDR probe signal. The data and OTDR probe signals, typically at different wavelengths, are coupled into one end of a trunk fiber which is coupled at its far end to an optical circuit that includes a number of wavelength-selective optical switches and has multiple out- (Continued)

puts that are directed to different end users. The optical switches are configurable so as to provide the OTDR probe signal to only one of the optical circuit's outputs while maintaining the data signal at the same output, while also maintaining the data signal, without the OTDR probe signal, at other outputs.

18 Claims, 7 Drawing Sheets

(56) References Cited

U.S. PATENT DOCUMENTS

| | | | |
|---|---|---|---|
| 2003/0210387 A1* | 11/2003 | Saunders | H04B 10/071 356/73 |
| 2008/0205885 A1 | 8/2008 | Watte et al. | |
| 2008/0291431 A1* | 11/2008 | Wang | G01M 11/3136 356/73.1 |
| 2012/0263458 A1* | 10/2012 | Wen | H04B 10/071 398/28 |
| 2014/0314104 A1* | 10/2014 | Huang | H04J 14/0239 370/542 |
| 2018/0045893 A1* | 2/2018 | Huybrechts | G02B 6/3538 |
| 2018/0316419 A1* | 11/2018 | Watte | H04B 10/071 |

FOREIGN PATENT DOCUMENTS

| | | |
|---|---|---|
| WO | 2015/092064 A1 | 6/2015 |
| WO | 2016/107769 A1 | 7/2016 |
| WO | 2016/131825 A1 | 8/2016 |

OTHER PUBLICATIONS

Yu, Y. et al., "A micro-fluidic-optical switch using multi-droplet resonators array", Transducers 2009: 2009 International Solid-State Sensors, Actuators and Microsystems Conference, IEEE, 2011-2013 (2009).

* cited by examiner

INTEGRATED OPTICAL SWITCHING AND SPLITTING FOR TROUBLESHOOTING IN OPTICAL NETWORKS

CROSS-REFERENCE TO RELATED APPLICATION

This application is a National Stage Application of PCT/EP2016/075475, filed on Oct. 21, 2016, which claims the benefit of U.S. Patent Application Ser. No. 62/245,650, filed on Oct. 23, 2015, the disclosures of which are incorporated herein by reference in their entireties. To the extent appropriate, a claim of priority is made to each of the above disclosed applications.

BACKGROUND OF THE INVENTION

The present invention is generally directed to optical transmission networks, and more particularly to systems that permit flexible configuration of optical components in the field.

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates one embodiment of a fiber optic data transmission network 100 deploying fiber optic lines. In the illustrated embodiment, the network 100 can include a central office 101 that connects a number of end subscribers 105 (also called end users 105 herein) in a network. The central office 101 can additionally connect to a larger network such as the Internet (not shown) and a public switched telephone network (PSTN). The network 100 can also include fiber distribution hubs (FDHs) 103 that distribute signals to the end users 105. The various lines of the network 100 can be aerial or housed within underground conduits.

The portion of the network 100 that is closest to central office 101 is generally referred to as the F1 region, where F1 is the "feeder fiber" or "trunk fiber" from the central office 101. The portion of the network 100 closest to the end users 105 can be referred to as an F2 portion of network 100. The network 100 includes a plurality of break-out locations 102 at which branch cables are separated out from the main cable lines. Branch cables are often connected to drop terminals 104 that include connector interfaces for facilitating coupling of the fibers of the branch cables to a plurality of different subscriber locations 105.

FDHs receive signals from the central office 101. The incoming signals may be split at the FDH 103, using one or more optical splitters (e.g., 1×8 splitters, 1×16 splitters, or 1×32 splitters) to generate different user signals that are directed to the individual end users 105 via local fibers 104.

Fault testing in the local fibers 104 and end user facility 105 can be time consuming and expensive. Typically, a technician visits the FDH 103 and manually disconnects the local fibers 104 for testing using Optical Time Domain Reflectometry (OTDR) to determine if there is a fault and where along the local fiber the fault is located. There is a requirement for an improved method for testing local fibers 103 for faults that is simpler, quicker and less expensive than the current method.

SUMMARY OF THE INVENTION

One embodiment of the invention is directed to an optical system that comprises an input waveguide capable of carrying an optical data transmission signal at a first wavelength and an optical time domain reflectometry (OTDR) signal at a second wavelength different from the first wavelength. The system also has a plurality of output waveguides capable of carrying the optical data transmission signal at the first wavelength and the OTDR signal at the second wavelength. A waveguide splitter module is coupled at an input side of the waveguide splitter module to the input waveguide and to the plurality of output waveguides at an output side of the waveguide splitter module. Wavelength-selective optical switches are disposed at respective locations at at least one of i) the plurality of output waveguides and ii) the waveguide splitter module. The wavelength-selective optical switches are configurable to permit the OTDR signal at the second wavelength to propagate along at least one of the plurality of output waveguides while permitting the optical data transmission signal at the first wavelength to propagate along the one of the plurality of output waveguides, while preventing the OTDR signal from propagating along others of the plurality of output waveguides at the same time as permitting the optical data transmission signal at the first wavelength to propagate along the others of the plurality of output waveguides. The wavelength-selective optical switches may be operated remotely.

Another embodiment of the invention is directed to an optical data transmission system that includes a laser transmitter/receiver unit capable of generating a data transmission signal at a first wavelength and OTDR unit capable of generating an OTDR probe signal at a second wavelength different from the first wavelength. A first coupler unit is coupled to receive the data transmission signal and the OTDR probe signal and to output a combined transmission signal comprising the data transmission signal and the OTDR probe signal. A first end of a trunk fiber is coupled to receive the combined transmission signal. An optical circuit has i) an input waveguide coupled to receive the combined transmission signal from a second end of the trunk fiber and ii) a plurality of outputs. The optical circuit is configurable so as to provide the OTDR probe signal to only one of the outputs while providing the data transmission signal to others of the outputs and to the one of the outputs.

Another embodiment of the invention is directed to a method of troubleshooting a network, that includes directing an optical data transmission signal through a splitter network, the splitter network having an input waveguide feeding into a splitter module, a plurality of output waveguides feeding from the splitter module and an plurality of wavelength-selective optical switches positioned associated with at least one of the splitter module and the plurality of output waveguides. The method also includes directing an optical time domain reflectometry (OTDR) probe signal toward the optical splitter network. The states of wavelength-selective optical switches in the splitter network are set so as to direct the OTDR probe signal to propagate out of a selected one of the plurality of output waveguides while permitting the optical data transmission signal to propagate out of all of the output waveguides of the plurality of output waveguides.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
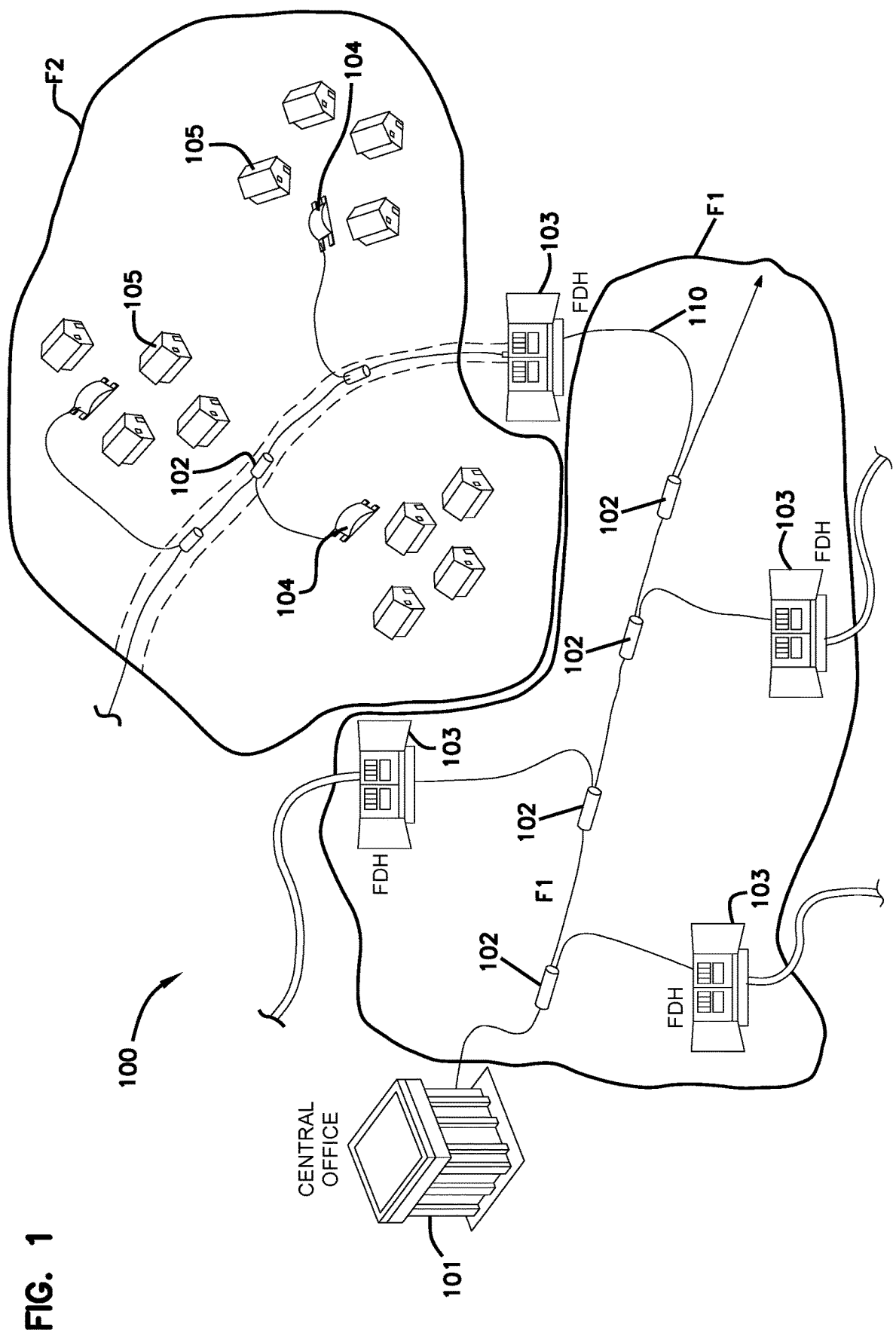
FIG. 1 schematically illustrates various elements of an optical data distribution and communication network.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to various optical devices and systems that can provide benefit in optical networks by providing for remote testing of fiber communications systems, thus reducing the need for technician visits to a fiber distribution hub (FDH) and allowing various test and, therefore, repair operations to be carried out more quickly than using conventional fiber maintenance and fault location equipment and procedures.

Figure 2:
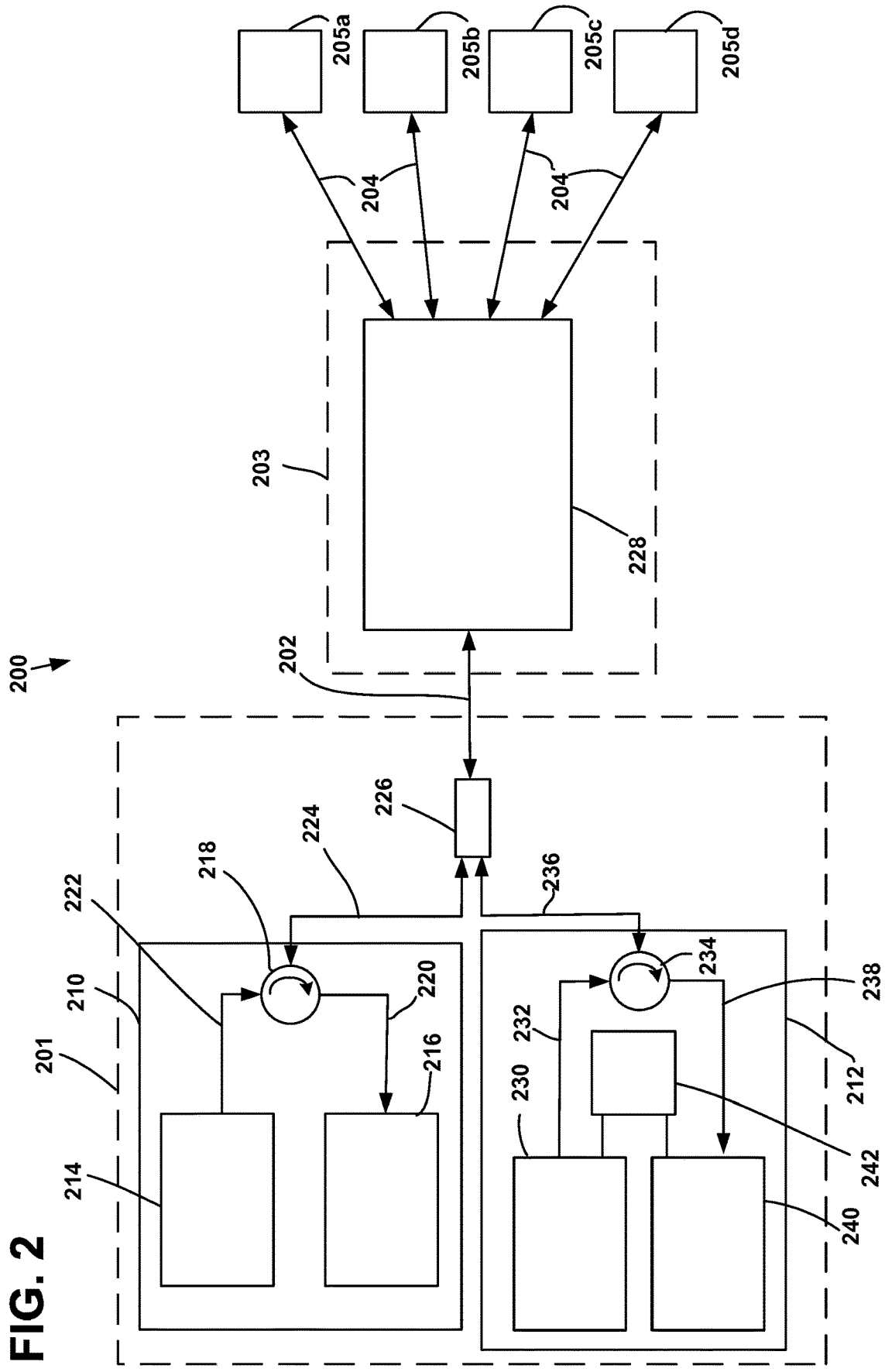
FIG. 2 schematically illustrates a system for remote testing elements of a fiber communications system according to an embodiment of the present invention.

One embodiment of a system that may be used for remote testing of optical fiber components in a fiber communications system is schematically illustrated in FIG. 2. The fiber communications system 200 includes a central office 201 connected to an FDH 203 via a main trunk fiber 202. Local fibers 204 connect individual end-users 205 to the FDH 203. In the illustrated embodiment there are four end-users 205a-205d, but it will be appreciated that a fiber communications network may have hundreds, even thousands of individual end users.

In this embodiment, the central office 201 includes a laser transmitter/receiver unit 210 that generates optical signals for transmitting information on the fiber communications network 201 to the end users 205 and receives optical data signals from the network 201. The information carried by the optical signals may include cable television and/or music, internet service and the like. The laser transmitter/receiver unit 210 typically produces and/or receives a broadband signal at in a wavelength range at or about 1310 nm, 1490 nm or 1550 nm, or at other wavelength range useful for data transmission (e.g. XGPON, NGPON2, DWDM-PON), or at some combination of these wavelengths.

The laser transmitter/receiver unit 210 may include an optical signal source 214 that generates an optical signal for transmission to the end users 205a-205d. An optical receiver 216 receives optical signals from the end users 205a-205d. An optical separator unit 218, for example a circulator, may be used to separate the incoming optical data signal 220, from the end users 205a-205d, from the transmitted data signal 222 generated by the optical signal source 214. A signal channel 224 carries the transmitted data signal 222 to a wavelength multiplexer/demultiplexer (WDM) 226 and carries the incoming optical data signal from the WDM 226 to the laser transmitter/receiver unit 210. The transmitted data signal propagates from the WDM 226 along the main trunk fiber 202 to the FDH 203 where an optical circuit 228 splits the incoming transmitted data signal among the local fibers 204 to the end user 205a-205d.

The central office 201 is also provided with a facility for receiving and detecting optical signals from the fiber communications system 200. The signal channel 224 is connected to the separator unit 218 which separates the incoming optical data signal received from the FDH 203, and which propagates along incoming optical data signal channel 220, from the transmitted optical data signal, which propagates along transmitted optical data signal channel 222. It will be appreciated that the signal channels 220 and 222 may be embodied as any suitable type of optical signal channel, for example a waveguide or optical fiber channel.

The incoming optical data signal is received at the optical receiver 216. The incoming optical data signal may be at the same wavelength as the transmitted data signal or, in some embodiments, the incoming optical data signal may be at a different wavelength. For example the transmitted data signal may be at 1550 nm while the received data signal, generated by the end users 205a-205d, may be at some other wavelength. Transmitted data signal and the incoming optical data signal are generally within a selected range of wavelengths used for data and information transmission, referred to herein as a "first wavelength."

An optical time domain reflectometry (OTDR) unit 212 generates an OTDR probe signal, typically short pulses at a wavelength different from the optical data signal transmission wavelength generated by the laser transmitter unit, and receives OTDR reflected signals from the network 201. The OTDR probe signal may have a wavelength of around 1600 nm, for example, typically outside the wavelength range of the optical data signals produced and received by the laser transmitter/receiver unit 210. The wavelength of the OTDR probe signal is referred herein as being at a second wavelength and is different from the first wavelength which describes the wavelength range of transmitted data in the fiber network.

The OTDR signal unit 212 typically includes an OTDR probe signal generator unit 230 to generate the pulsed OTDR probe signal that propagates along an OTDR probe signal channel 232. In this embodiment, the OTDR probe signal enters an OTDR channel 236 via a circulator 234. The OTDR channel 236 is connected between the circulator 234 and the WDM 226, so that the OTDR probe signal is launched into the fiber network via the main trunk fiber 202. The OTDR probe signals are directed within the optical circuit 228 to a selected local fiber 204, using various methods as described below, to test the optical path to each end user 205a-205d.

Reflected OTDR signals from the FDH 203 propagate along the main trunk fiber 202 to the WDM 226, where they are separated from the incoming optical data signal and directed along the OTDR channel 236 to the OTDR unit 212. The circulator 234 directs the reflected OTDR signals to the OTDR detector unit 240 via a reflected OTDR signal channel 238.

OTDR can locate the position of a discontinuity in a fiber network, such as a coupling between fibers, or a fault or break, by transmitting a pulse along the fiber network and measuring the time elapsed before receiving the pulse or pulses reflected at the discontinuity. A fiber may have more than one discontinuity that generates reflected pulses. The OTDR unit 212 may include an OTDR controller 242 that controls the generation of the OTDR probe signals and measures the time of flight of the reflected OTDR pulses in order to determine the location of a fault, such as a break in an optical fiber of the fiber communication system 200. The OTDR control unit 242 may record a "reference" OTDR reading for each individual fiber path in the fiber network for use as a baseline against which future OTDR readings can be compared to determine if there have been any changes to a particular fiber path.

There can be many different fiber paths within a fiber network. In the embodiment illustrated in FIG. 2, for example, there are four different fiber paths, each one between the central office 201 and one of the four end users 205a-205d. In order to correctly track the position of a fault in the fiber network, it is preferable to be able to perform an OTDR test on each fiber path separately from the others. It is also preferable that such OTDR testing takes place without interrupting the service on the different fiber paths. The optical circuit 228 may include various elements that permit the OTDR testing of a selected, single fiber path without interrupting service.

Figure 3:
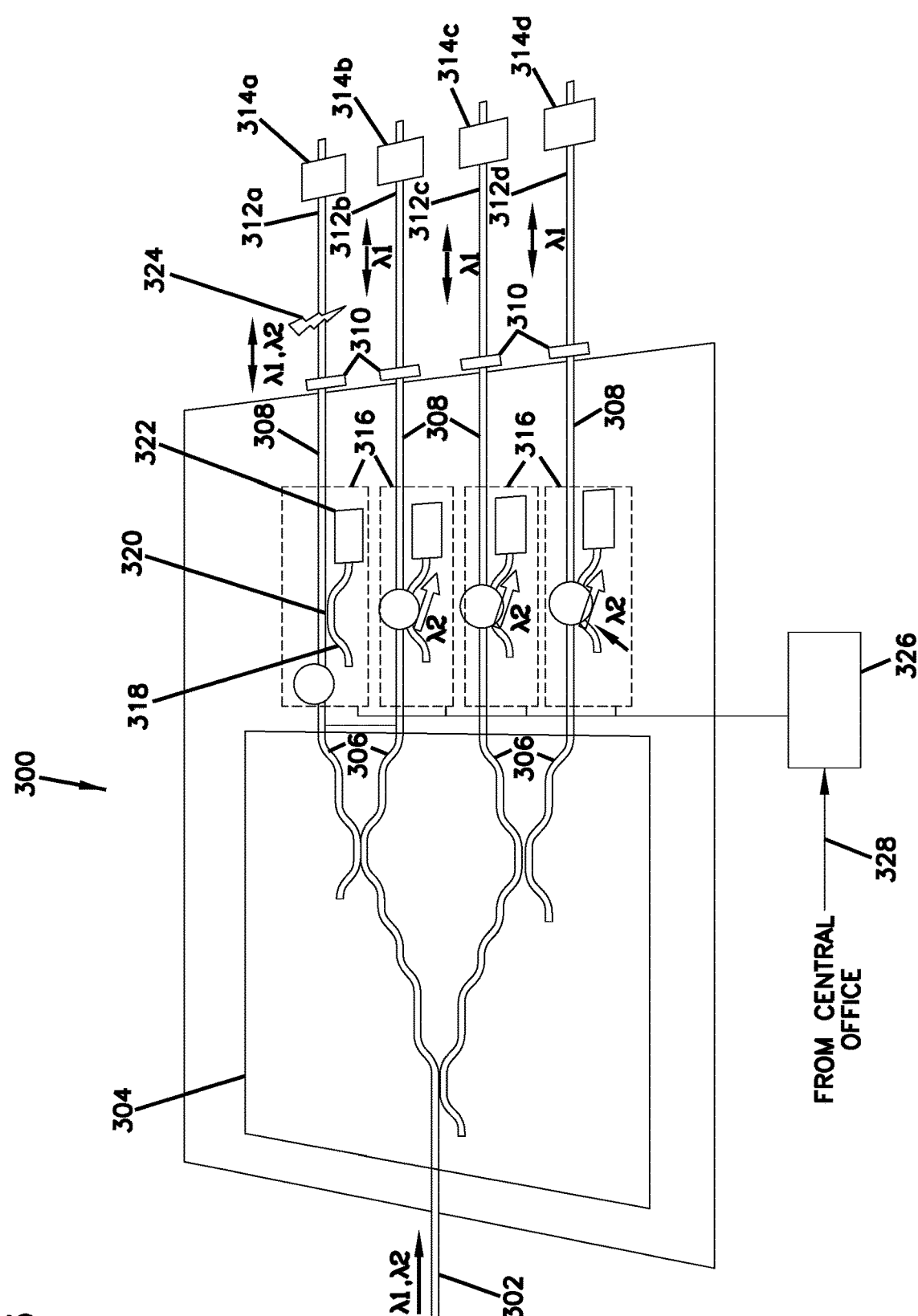
FIG. 3 schematically illustrates an active optical circuit for providing remote fiber testing capabilities in a fiber communications system, according to an embodiment of the present invention.

One embodiment of an optical circuit 300 that permits OTDR testing of different fiber paths is now described with reference to FIG. 3. The optical circuit 300 includes an input waveguide 302, couplable to the trunk fiber 202, for receiving the combined transmission signal at the first and second wavelengths, λ1, λ2. The input waveguide 302 is coupled at an input end of a splitter module 304. The splitter module 304 contains a waveguide splitter arrangement for splitting the input signal into a number, often a power of 2, parallel splitter outputs. The splitting may be done equally, so that each splitter output contains approximately the same optical power, or may be done unequally. For example, it may be desirable for a particular splitter output to receive more optical power if it is feeding signal to a local fiber that travels further than others, or has more end users than others. It is often preferred to adjust the amount of optical power directed into each local fiber to balance the losses in each local fiber so that an end user 314 receives an optical signal approximately the same strength as the other end users 314. The splitter module 304 may use a cascade of y-couplers or the like, arranged in any suitable architecture for splitting the input to produce a number of parallel transmission signals. In the illustrated embodiment, the splitter module 304 does not contain any active switching elements and, therefore, is referred to as a passive splitter module.

In the illustrated embodiment, the splitter module 304 is a 1:4 splitter, producing four parallel transmission signals, on splitter waveguides 306, from the single combined transmission signal entering via the input waveguide 302. The splitter waveguides 306 couple to output waveguides 308. Each output waveguide 308 couples via fiber coupler 310 to a respective local fiber 312a-312d that couples to a respective end user 314a-314d.

In some embodiments, the output waveguides 308 may simply be continuations of the splitter waveguides 306. The output waveguides 308 are provided with wavelength-selective optical switches 316. A wavelength-selective optical switch 316 has two states, viz. a pass state in which the switch passes the OTDR probe signal at the second wavelength and a block state in which the switch blocks the OTDR probe signal. The wavelength-selective optical switch 316 transmits the transmitted data signal at the first wavelength in both the pass state and the block state. Thus, by selectively switching one of the wavelength-selective optical switches 316 to a pass state while the others are in a block state, the OTDR probe signal can be selectively transmitted along any one of the local fibers 312a-312d to test a particular local fiber 312a-312d for faults.

In the illustrated embodiment, the wavelength-selective switch is based on an electro-wetting optical device (EWOD). The use of an EWOD for switching is explained further in WO 2015/092064 A1, "Adiabatic Coupler," filed on Dec. 21, 2014 and in U.S. Provisional Patent Application No. 62/094,506, "Integrated Optical Switching and Splitting for Optical Networks," filed on Dec. 19, 2014, both of which are incorporated herein by reference. In an EWOD, a droplet of an electro-wetting material is moved relative to an optical waveguide through the application of an electrical field to the electro-wetting material. The resultant motion of the electro-wetting material can result in a change in the effective refractive index in the region of the waveguide, which results in a change in its optical properties. One approach for using an EWOD as a switch, is to use the motion of the electro-wetting material to change the optical coupling between two waveguides.

Figure 4B:
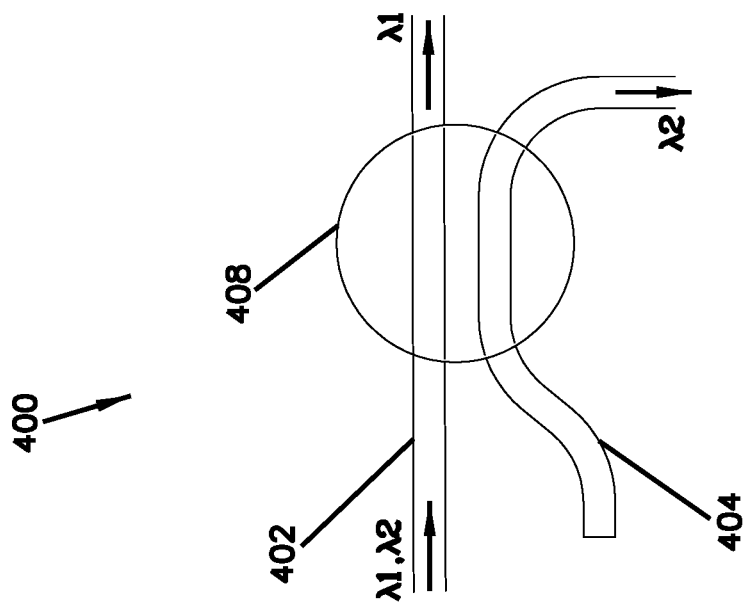
FIGS. 4A and 4B schematically illustrate one embodiment of an electro-wetting optical device (EWOD), wavelength-selective optical switch.
Figure 4A:
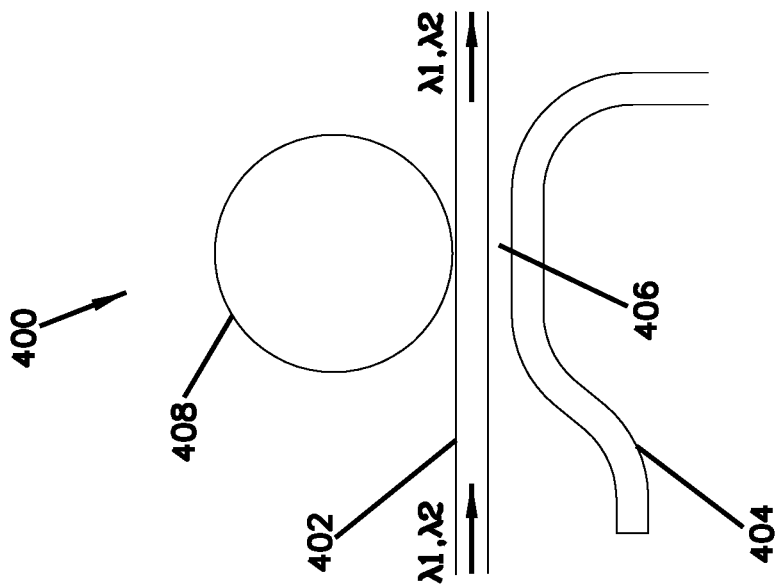

An embodiment of a wavelength-selective EWOD switch 400, referred to as an EWOD coupler switch, is schematically illustrated in FIGS. 4A and 4B. The switch has a first waveguide 402 and a second waveguide 404. A portion of the second waveguide 402 lies close to the first waveguide 402, close enough for light to couple between the first and second waveguides 402, 404. This region is referred to as the coupling region 406. In the pass state, illustrated in FIG. 4A, a droplet 408 of dielectric material is distant from the coupling region 406 so that it does not affect coupling between the two waveguides 402, 404. When light at different wavelengths, λ1 and λ2 passes along the first waveguide 402, both wavelengths are transmitted along the first waveguide 402. In FIG. 4B, the droplet 408 has been moved over the coupling region 406 so that the switch 400 is in a block state. The coupling factors for this switch 400 are selected so that, when the switch is in the block state, light at λ2 is coupled into the second waveguide 404. Light at 2J is not coupled into the second waveguide 404 to a significant degree, and continues to propagate along the first waveguide 402.

FIGS. 4A and 4B illustrate movement of the droplet 408 in a direction perpendicular to the waveguide 402 to a position over the coupling region 406. This need not be the case, and the droplet 408 may move in a different direction in order to change between the pass and block states. For example, the droplet 408 may move in a direction parallel to the first waveguide 402. An advantage of using an EWOD switch is that the pass and block states can remain persistent without an applied signal. Thus, an EWOD switch can require power only to switch between states, but not to maintain a state. This is advantageous in reducing the power requirements for an optical circuit at a remote location such as an FDH.

The second waveguide 404 can lead to a dissipating element to remove the light at $\lambda 2$. The dissipating element can be, for example, an absorber that absorbs the incident light at $\lambda 2$, or a reflector such as a Bragg grating or mirrored surface on a beveled portion, that couples the light out of the second waveguide 404 so that it is lost. If such a switch is employed in a communications system to drop an OTDR signal from a waveguide so that the waveguide and any subsequent fibers and other components cannot produce a reflected OTDR signal, it is preferred that the second waveguide 404 directs the light at $\lambda 2$ to a dissipating element that produces little or no reflection.

In a different approach to dissipating light, a droplet positioned over a waveguide may contain absorbing components, for example a suspension of quantum dots or absorbing molecules, that absorb light at $\lambda 2$ but do not absorb light at $\lambda 1$. Thus, when the droplet is not over the waveguide, the light at both $\lambda 1$ and $\lambda 2$ propagates through the switch essentially without change. However, when the droplet is moved over the waveguide, the light at $\lambda 2$ may be significantly absorbed, leaving only the light at $\lambda 1$ propagating along the waveguide. Such an embodiment does not require a second waveguide that forms a coupling region with a first waveguide.

A switch in which the light at one wavelength is removed from one waveguide so that it can be dissipated, preferably with minimal reflection that can contribute to an aberrant OTDR signal, is referred to herein as a dissipating optical switch.

In another embodiment, it may be desired to use the light at $\lambda 2$ after it has been coupled into the second waveguide 404. Accordingly, the second waveguide 404 may be coupled to another downstream element that uses the light at $\lambda 2$, for example a further splitter element. In such a case, the switch 400 is used to direct light to one waveguide or the other for propagating along that waveguide to a subsequent element, and is referred to herein as a directing optical switch.

The wavelength-selective optical switches 316 in optical circuit 300 are shown with an embodiment of a dissipating switch that uses an absorber. Each switch 316 has a secondary waveguide 318 that forms a coupling region 320 with the output waveguide 308. The secondary waveguide 318 couples to an absorber 322. The absorber 322 may be implemented in any way that effectively absorbs the OTDR probe signal. For example, an absorber may be implemented by etching the glass waveguide to provide a trench and then filling the trench with a material that absorbs at the OTDR probe signal wavelength. Suitable absorbing materials include indium tin oxide, vanadium oxides and the like and suitable metals, such as silver and platinum. The absorbing material may be coated in the trench using any suitable technique, e.g. sputter or vapor deposition. In another approach, the waveguide may intersect a pocket that contains an absorbing liquid. For example, fluid dispersions of nanocrystalline doped phases may be used as absorbers. Exemplary materials used for absorbing are sulfide and selenide nanoparticles and semiconductor quantum dots.

In the illustrated embodiment, the optical switch 316 of the uppermost output waveguide 308 is in the pass state, transmitting both the transmitted optical signal at 2J and the OTDR signal at $\lambda 2$ along local fiber 312a, while the remaining optical switches 316 are in the block state, coupling the OTDR signal at $\lambda 2$ to the absorber 322. Thus, the local fiber 312a can be probed to find the location of a fault 324. Other local fibers can by OTDR probed in turn by activating the respective optical switch 316. In this embodiment, the system 300 is able to continue transmitting optical data signals to the end users 314a-314d while each of the local fibers 312a-312d is OTDR probed.

The optical switches 316 may be controlled locally or remotely via an optical switch controller 326, which is coupled to activate the optical switches 316. In remote operation, the optical switch controller 326 may receive a switch control input 328 from the central office that provides instructions to the optical switch controller 326 for which optical switch 316 to activate or deactivate. The control signal 328 may be electrical, or may be optical, for example as further described in U.S. Patent Application No. 62/116,784, titled "Remote Control and Power Supply for Optical Networks" and filed on Feb. 16, 2015, incorporated herein by reference.

Figure 5:
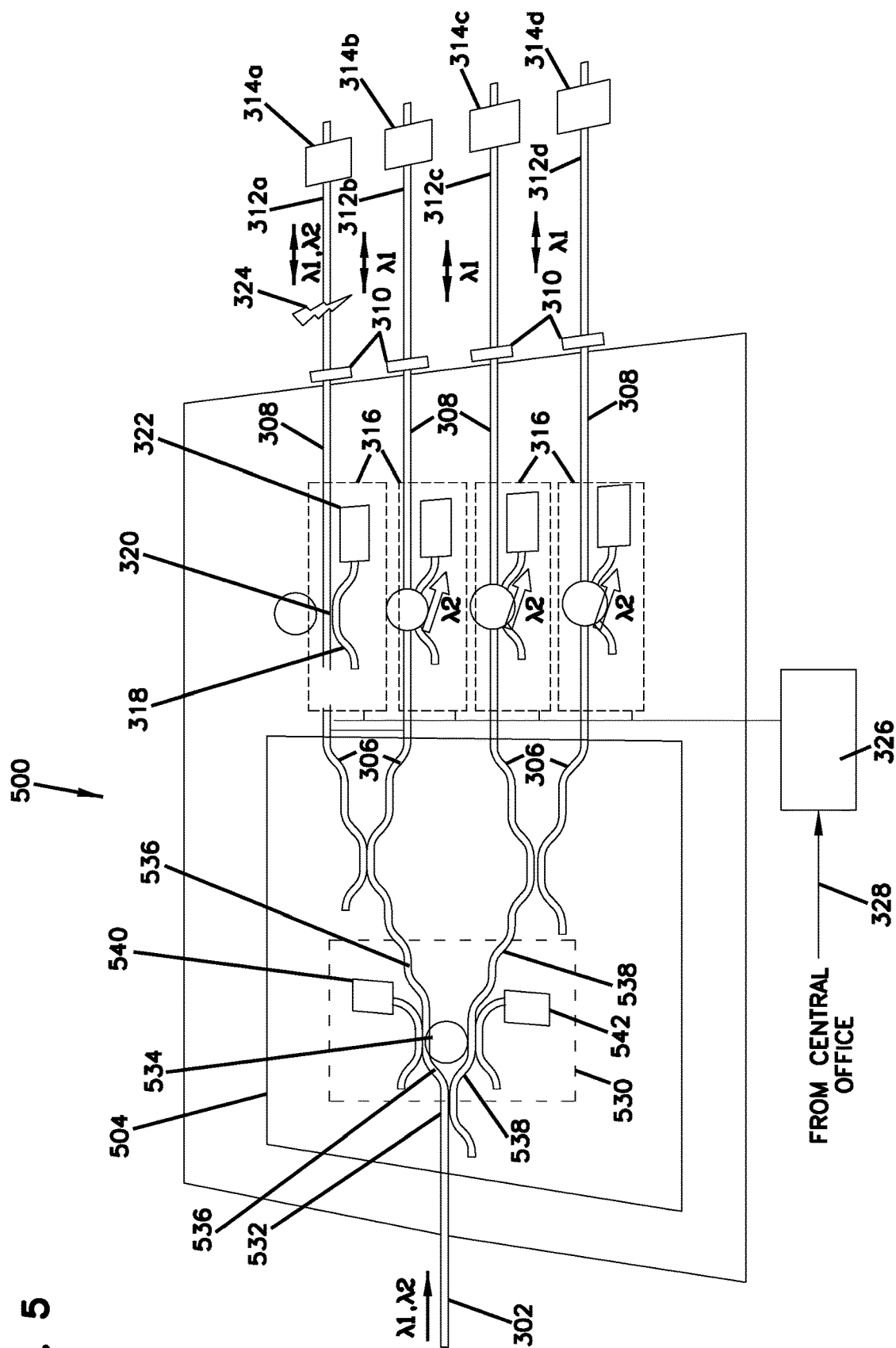
FIG. 5 schematically illustrates an active optical circuit for providing remote fiber testing capabilities in a fiber communications system, according to another embodiment of the present invention.

Another embodiment of optical circuit 500 is schematically illustrated in FIG. 5. Elements of optical circuit 500 like those of optical circuit 300 are marked with similar numbers. The splitter module 504 includes a wavelength-selective optical switch 530, and so the splitter module 504 may be referred to as an active splitter module. In the illustrated embodiment, the wavelength-selective optical switch 530 is an absorbing switch located just after the first branching point 532 of the splitter module 504. The wavelength-selective optical switch 530 is implemented with a droplet 534 that can be placed in at least three different positions, viz. i) a neutral position between the upper branch waveguide 536 and the lower branch waveguide 538 (as illustrated), ii) over the coupling region of the upper branch waveguide 536 to direct OTDR signal light in the upper branch waveguide 536 towards an upper branch dissipating element 540, and iii) over the coupling region of the lower branch waveguide 538 to direct OTDR signal light in the lower branch waveguide 538 towards a lower branch dissipating element 542. In this embodiment, the wavelength-selective optical switch 530 can be activated to block the transmission of the OTDR signal into either the upper branch waveguide 536 or lower branch waveguide 538 as desired. An advantage of this embodiment is that there can be increased attenuation of the OTDR probe signal along those local fibers that are fed signals from the branch where the OTDR signal is blocked.

Figure 6:
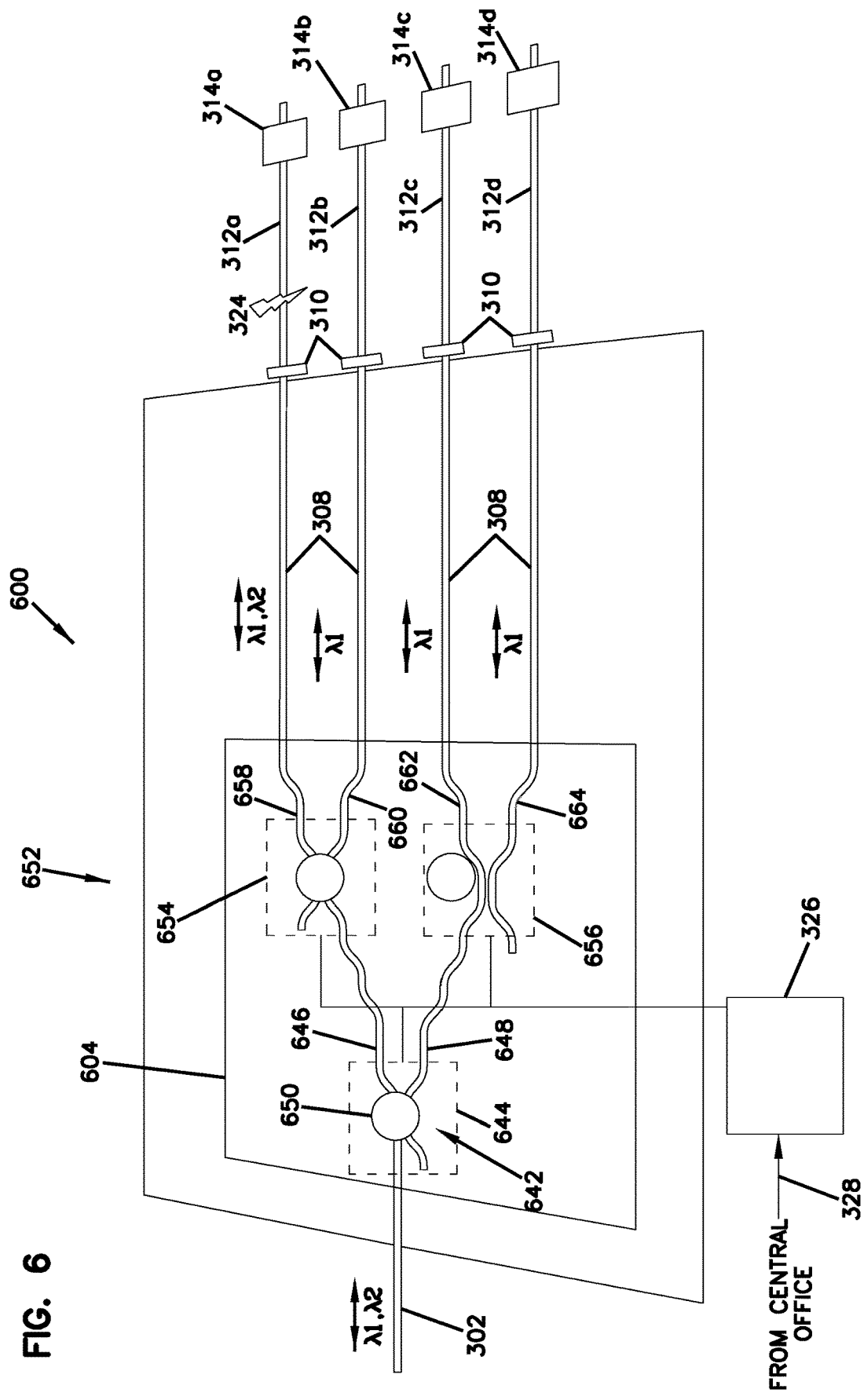
FIG. 6 schematically illustrates an active optical circuit for providing remote fiber testing capabilities in a fiber communications system, according to another embodiment of the present invention.

Another embodiment of optical circuit 600 can be used to select a single local fiber for OTDR probing, while still maintaining a data transmission signal on all local fibers, is schematically illustrated in FIG. 6. In the illustrated embodiment, the splitter module 604 is an active splitter module that uses directing wavelength-selective optical switches, rather than dissipating switches.

Light entering the optical circuit 600 along waveguide 302 is incident at the first branch point 642, which includes a first wavelength-selective optical switch 644. In this embodiment, the first wavelength-selective optical switch 644 is configured to split the incident optical data transmission signal substantially equally between the upper and lower output waveguide branches 646, 648, regardless of the position of the droplet 650. Transmission of the OTDR probe signal through the switch 644, however, is dependent on the state of the switch 644. In a first state, the switch 644 directs the OTDR probe signal to the upper branch 646 and, in a second state, the switch 644 directs the OTDR signal to the lower branch. In the illustrated embodiment, the first state is achieved with the droplet 650 over the coupling region of the switch 644, and the second state is achieved with the droplet 650 at a position removed from the coupling region.

A second tier of splitters 652 follows the first switch 644 and includes two wavelength-selective optical switches 654, 656. The upper output waveguide branch 646 from the first switch 644 is coupled as an input to switch 654, which has upper and lower output waveguide branches 658, 660. The upper output waveguide branch 658 couples via an output waveguide 308 to local fiber 312a, while lower output waveguide branch 660 couples via an output waveguide 308 to local fiber 312b. The lower output waveguide branch 648 from the first switch 644 is coupled as an input to switch 656, which has upper and lower output waveguide branches 662, 664. The upper output waveguide branch 662 couples via an output waveguide 308 to local fiber 312c, while lower output waveguide branch 664 couples via an output waveguide 308 to local fiber 312d.

In the illustrated switch configuration, both switch 644 and switch 654 are configured to direct the OTDR probe signal into their respective upper output waveguide branches 646, 658, so that the OTDR probe signal is launched into local fiber 312a. Switch 656 is illustrated in a configuration to direct an OTDR probe signal into its lower output waveguide branch 664, although substantially no OTDR probe light reaches switch 656 because the first switch 644 directs the OTDR probe signal into its upper output waveguide branch 646.

The optical switch controller 326 controls the configurations of the switches 644, 654, 656, to select which local fiber 312a-312d is probed by the OTDR signal.

Figure 7:
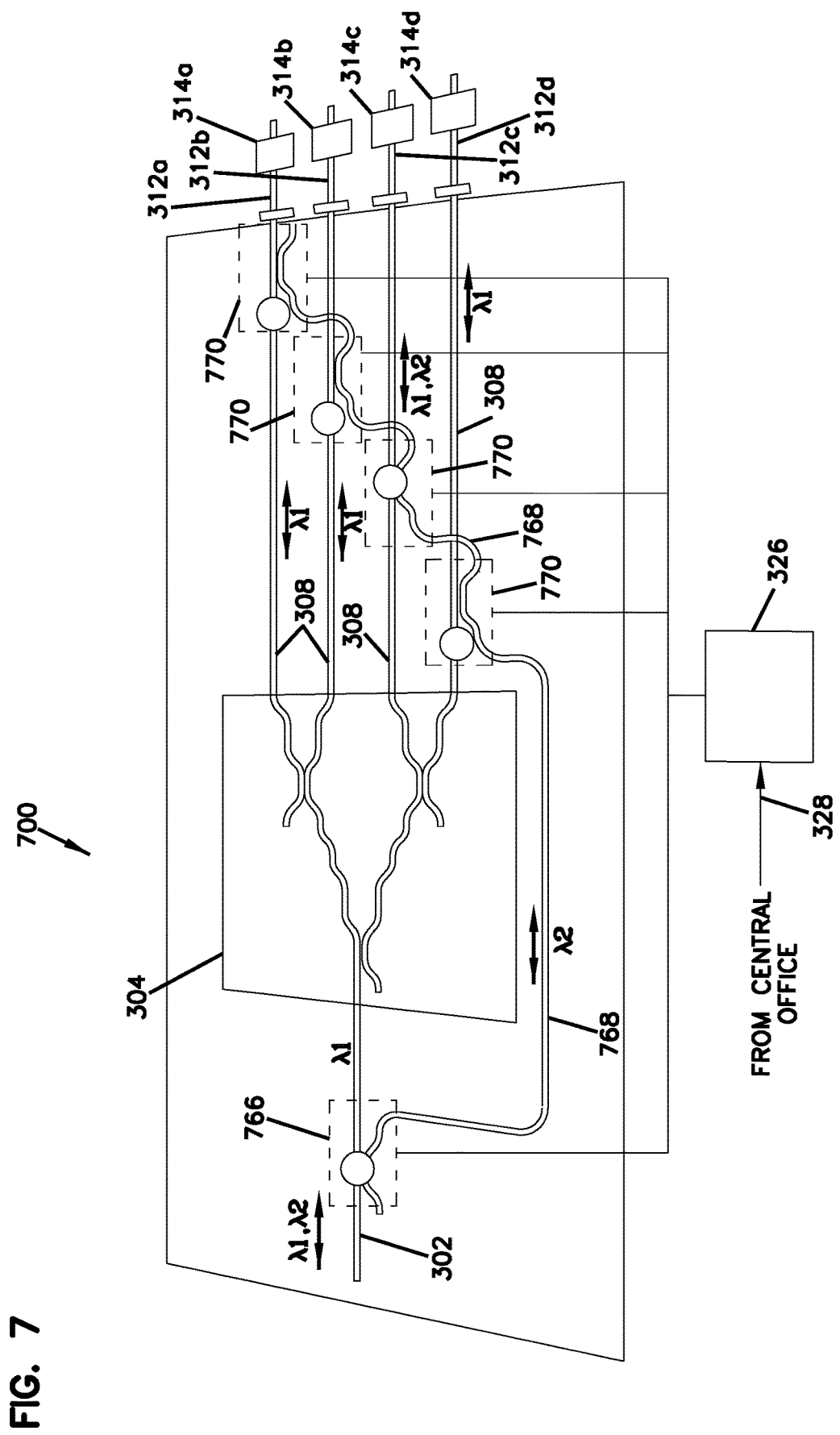
FIG. 7 schematically illustrates an active optical circuit for providing remote fiber testing capabilities in a fiber communications system, according to another embodiment of the present invention.

Another embodiment of optical circuit 700 can be used to select a single local fiber for OTDR probing, while still maintaining a data transmission signal on all local fibers, is schematically illustrated in FIG. 7. In the illustrated embodiment, the light entering the input waveguide 302 is split using a demultiplexing coupler 766. The data signal light passes through the coupler 766 to the splitter module 304. The OTDR probe signal is separated from the data signal light by the demultiplexing coupler into a bypass waveguide 768 that bypasses the splitter module 304. The demultiplexing coupler may be any suitable type of demultiplexing element. In the illustrated embodiment, the demultiplexing coupler 766 is an EWOD wavelength-selective optical switch, controllable by an optical switch controller 326.

The data signal light passes through the splitter module 304, where it is split into a number of different output waveguides 308. The bypass waveguide 768 is provided with a number of wavelength-selective optical switches 770 arranged in cascade that allow coupling of the OTDR probe signal into a selected output waveguide 308. Thus, the bypass waveguide 768 passes close to each of the output waveguides 308 in turn and a switch 770 is located where the bypass waveguide 768 closely approaches an output waveguide 308, for coupling the OTDR probe signal into the selected output waveguide 308. In this approach, the OTDR probe and reflected signals do not pass through the splitter module 304, and so may experience lower losses.

The switches 770 may be EWOD wavelength-selective optical switches as described above. When a switch 770 is in a pass state, the OTDR probe signal continues propagation along the bypass waveguide 768, without coupling into an output waveguide. When the switch 770 is in a cross state, the OTDR signal is coupled into the output waveguide 308, to co-propagate along that waveguide with the data transmission signal. The optical switch controller 326 controls the configurations of the switches 770 to select which local fiber 312a-312d is probed by the OTDR signal. In the illustrated embodiment, the optical switch controller 326 had controlled one of the switches 700 to direct an OTDR signal along local fiber 312c towards end user 314c.

While various examples were provided above, the present invention is not limited to the specifics of the examples. For example, various combinations of elements shown in different figures may be combined together in various ways to form additional optical circuits not specifically described herein. For example, the illustrated embodiments use a 1:4 splitter module. Other embodiments may use a splitter module with a higher number of outputs, for example a 1:32 or 1:64 splitter module. Furthermore, additional arrangements of wavelength-selective optical switches may be used. For example, in a variation of the embodiment illustrated in FIG. 5, the splitter module may include switches at each branching point. Such switches may be dissipating switches, for example implemented in a manner like that shown for switch 530, or may be directing switches. Other optical circuits according to the present invention may include different combinations of directing switches and dissipating switches implemented on the output waveguides or within the splitter module.

The terms "input" and "output" have been used in conjunction with various optical elements in the discussion above, for example a splitter module has been described as having an input waveguide and output waveguides. It is understood that light signals propagate in forward and reverse directions within the fiber data networks discussed here, and that light can propagate through many of the elements described in forward and reverse directions. The words "input" and "output" have not been used in any sense to restrict the direction of light propagation through an element, but merely to distinguish relative sides of various optical elements.

As noted above, the present invention is applicable to fiber optical communication and data transmission systems. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

ELEMENT LISTING BY NUMBER

100: Fiber optical data transmission network
101: Central office
102: Break-out locations
103: Fiber distribution hub (FDH)
104: Drop terminal
105: End user
200: Fiber communications system
201: Central office
202: Main trunk fiber
203: FDH
204: Local fibers
205a-205d: End-users 210: Laser transmitter/receiver unit
212: OTDR unit
214: Optical signal source
216: Optical receiver
218: Optical separator unit
220: Incoming optical data signal channel
222: Transmitted optical data signal channel
224: Signal channel
226: WDM
228: Optical circuit
230: OTDR probe signal generator unit
232: OTDR probe signal channel
234: Circulator
236: OTDR channel
238: Reflected OTDR signal channel
240: OTDR detector unit
242: OTDR control unit
300: Optical circuit
302: Input waveguide
304: Splitter module
306: Splitter waveguide
308: Output waveguide
310: Fiber coupler
312a-d: Local fiber
314a-d: End user
316: Wavelength-selective optical switch
318: Secondary waveguide
320: Coupling region
322: Absorber
324: Fiber fault
326: Optical switch controller
328: Switch control input
400: Wavelength-selective optical switch
402: First waveguide
404: Second waveguide
406: Coupling region
408: Droplet
500: Optical circuit
504: Splitter module
530: Wavelength-selective optical switch
532: First branching point
534: Optical switch droplet
536: Upper waveguide branch
538: Lower waveguide branch
540: Upper branch dissipating element
542: Lower branch dissipating element
600: Optical circuit
604: Splitter module
644: First wavelength-selective optical switch
646: Upper output waveguide branch
648: Lower output waveguide branch
650: Droplet
652: Second splitting tier
654: Wavelength-selective optical switch
656: Wavelength-selective optical switch
658: Upper output waveguide branch
660: Lower output waveguide branch
662: Upper output waveguide branch
664: Lower output waveguide branch
766: demultiplexing coupler
768: bypass waveguide
770: wavelength-selective optical switch

What we claim as the invention is:

1. An optical data transmission system, comprising:
a laser transmitter/receiver unit capable of generating a data transmission signal at a first wavelength;
an OTDR unit capable of generating an OTDR probe signal at a second wavelength different from the first wavelength;
a first coupler unit coupled to receive the data transmission signal and the OTDR probe signal and to output a combined transmission signal comprising the data transmission signal and the OTDR probe signal;
a trunk fiber coupled to receive the combined transmission signal in a first end of the trunk fiber;
an optical circuit comprising
 i) an input waveguide coupled to receive the combined transmission signal from a second end of the trunk fiber,
 ii) a plurality of outputs, and
 iii) an optical network comprising a waveguide splitter module connecting between the input waveguide and the plurality of outputs, the optical network having a plurality of output waveguides coupling to respective outputs of the plurality of outputs, the optical network further comprising at least two wavelength-dependent optical switches disposed on paths taken by the data transmission signal;
wherein the optical circuit is configurable so as to provide the OTDR probe signal to only one of the outputs while providing the data transmission signal to others of the outputs and to the one of the outputs.

2. A system as recited in claim 1, wherein the waveguide splitter module comprises a passive waveguide splitter module, and the at least two wavelength-dependent switches comprise wavelength selective switches on respective output waveguides of the passive waveguide splitter module.

3. A system as recited in claim 1, wherein at least one of the at least two wavelength-dependent optical switches is disposed in the waveguide splitter module and at least another of the at least two wavelength-dependent optical switches is disposed on one of the output waveguides of the waveguide splitter module.

4. A system as recited in claim 1, wherein at least two of the at least two wavelength-dependent selective optical switches are disposed to actively switch the OTDR probe signal within the waveguide splitter module.

5. A system as recited in claim 1, wherein the input waveguide comprises a demultiplexing coupler coupled to direct the OTDR signal into a bypass waveguide, the at least two wavelength-dependent optical switches being disposed on the output waveguides and in cascade along the bypass waveguide to switch the OTDR signal into respective output waveguides.

6. A system as recited in claim 1, further comprising local fibers coupled to respective outputs of the optical circuit, the OTDR probe signal propagating along a tested local fiber selected from the local fibers.

7. A system as recited in claim 6, wherein the OTDR unit is coupled to receive a reflected OTDR signal from the tested local fiber.

8. A system as recited in claim 1, wherein the laser transmitter/receiver unit further comprises a separator coupled to provide the data transmission signal to the trunk fiber and to provide an incoming optical data signal unit received from the trunk fiber to an optical receiver.

9. A system as recited in claim 1, wherein at least one of the wavelength-dependent optical switches is an absorbing optical switch.

10. A system as recited in claim 1, wherein at least one of the wavelength-dependent optical switches is a directing switch.

11. An optical system as recited in claim 1, wherein all of wavelength-dependent optical switches are absorbing switches.

12. A method of troubleshooting an optical communications network, comprising:
   directing an optical data transmission signal through a splitter network, the splitter network comprising an input waveguide feeding into a splitter module, a plurality of output waveguides feeding from the splitter module and at least two wavelength-dependent optical switches disposed on paths taken by the optical data transmission signal between the input waveguide and the output waveguides;
   directing an optical time domain reflectometry (OTDR) probe signal toward the optical splitter network;
   setting states of wavelength-dependent optical switches in the splitter network so as to direct the OTDR probe signal along a selected one of the plurality of output waveguides while permitting the optical data transmission signal to propagate out of all of the output waveguides of the plurality of output waveguides.

13. A method as recited in claim 12, further comprising detecting an OTDR reflected signal from an optical path associated with the selected one of the plurality of output waveguides.

14. A method as recited in claim 12, wherein setting the states of the wavelength-dependent optical switches comprises absorbing the OTDR probe signal at wavelength-dependent optical switches associated with optical paths of the unselected output waveguides of the plurality of output waveguides.

15. A method as recited in claim 12, wherein the splitter network is a passive splitter network and the at least two wavelength-dependent optical switches are disposed on respective output waveguides.

16. A method as recited in claim 12, wherein at least one of the at least two wavelength-dependent optical switches is disposed within the splitter network and another of the at least two wavelength-dependent optical switches is disposed one of the output waveguides.

17. A method as recited in claim 12, wherein the at least two wavelength-dependent switches are disposed in the splitter network.

18. A method as recited in claim 12, wherein the at least two wavelength-dependent optical switches are disposed on respective output waveguides, and further comprising splitting the OTDR signal from the optical data transmission signal before the splitter network and directing the OTDR signal along a bypass waveguide via the at least two wavelength-dependent optical switches in cascade, the at least two wavelength-dependent optical switches being configured to direct the OTDR signal along a selected output waveguide.

* * * * *